United States Patent
Dake

(10) Patent No.: US 9,749,591 B2
(45) Date of Patent: Aug. 29, 2017

(54) FOCUS POSITION MAINTAINING APPARATUS, AND MICROSCOPE

(71) Applicant: NIKON CORPORATION, Tokyo (JP)

(72) Inventor: Fumihiro Dake, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 460 days.

(21) Appl. No.: 13/927,747

(22) Filed: Jun. 26, 2013

(65) Prior Publication Data

US 2013/0286182 A1 Oct. 31, 2013

Related U.S. Application Data

(63) Continuation of application No. PCT/JP2012/050673, filed on Jan. 16, 2012.

(30) Foreign Application Priority Data

Jan. 21, 2011 (JP) .................................. 2011-010445
Oct. 20, 2011 (JP) .................................. 2011-230560

(51) Int. Cl.
*H04N 7/18* (2006.01)
*G02B 3/00* (2006.01)
*G02B 21/24* (2006.01)

(52) U.S. Cl.
CPC ............. *H04N 7/18* (2013.01); *G02B 3/0056* (2013.01); *G02B 21/244* (2013.01)

(58) Field of Classification Search
CPC .... G02B 21/244; G02B 3/0056; G02B 21/00; G02B 21/36; H04N 7/18; A61B 10/00;

(Continued)

(56) References Cited

U.S. PATENT DOCUMENTS 4,562,345 A * 12/1985 Aoki et al. ................. 250/201.8
4,932,781 A *  6/1990 Kuwayama .................... 356/505

(Continued)

FOREIGN PATENT DOCUMENTS

JP     A-9-80301      3/1997
JP     A-11-118446    4/1999

(Continued)

OTHER PUBLICATIONS

JP2010217317MT, English Translation of foreign document JP2010217317A can be download from JPO Web Site, Sep. 2010.*

(Continued)

*Primary Examiner* — Shan Elahi
(74) *Attorney, Agent, or Firm* — Oliff PLC

(57) ABSTRACT

A focus position maintaining apparatus and a microscope are provided. The focus position maintaining apparatus can three-dimensionally correct a shift of a specimen in real time to maintain the focal point of an objective lens in a desired position in the specimen, and the microscope includes the focus position maintaining apparatus. The focus position maintaining apparatus includes a microlens array having a plurality of unit lenses and disposed in a position where the microlens array receives light from a specimen via an objective lens, a focus imaging device disposed in a position where the focus imaging device receives light from the unit lenses of the microlens array, and a control unit that outputs a signal for controlling operation of a focus actuator based on image formation positions of a plurality of images of the specimen detected by the focus imaging device via the microlens array.

13 Claims, 11 Drawing Sheets

(58) Field of Classification Search
CPC ........ G01B 11/24; G01B 11/25; G01N 21/17; G01N 21/64
USPC .......................................................... 348/79
See application file for complete search history.

(56) References Cited

U.S. PATENT DOCUMENTS

| | | | | |
|---|---|---|---|---|
| 5,995,143 | A * | 11/1999 | Price | G02B 21/244 348/345 |
| 6,094,413 | A * | 7/2000 | Guerra | B82Y 10/00 369/112.01 |
| 6,711,283 | B1 * | 3/2004 | Soenksen | 382/133 |
| 7,034,883 | B1 * | 4/2006 | Rosenqvist | H04N 5/23212 348/345 |
| 8,290,358 | B1 * | 10/2012 | Georgiev | G03B 35/10 396/326 |
| 8,619,177 | B2 * | 12/2013 | Perwass | H04N 5/2254 348/222.1 |
| 2001/0021145 | A1 * | 9/2001 | Ichimura | B82Y 10/00 369/43 |
| 2003/0086608 | A1 * | 5/2003 | Frost | G01N 15/147 382/173 |
| 2004/0113043 | A1 * | 6/2004 | Ishikawa | G02B 21/245 250/201.4 |
| 2006/0007418 | A1 * | 1/2006 | Hamatani | G03F 7/706 355/52 |
| 2007/0057159 | A1 * | 3/2007 | Hing | 250/214 R |
| 2007/0147673 | A1 * | 6/2007 | Crandall | G02B 21/367 382/128 |
| 2008/0002253 | A1 * | 1/2008 | Jennings | G02B 27/0955 359/385 |
| 2008/0062501 | A1 * | 3/2008 | Tajiri | 359/237 |
| 2008/0142681 | A1 * | 6/2008 | Takizawa et al. | 250/201.3 |
| 2008/0302947 | A1 * | 12/2008 | Utagawa | G02B 7/32 250/201.8 |
| 2009/0185167 | A1 * | 7/2009 | Gouch | 356/73 |
| 2010/0172020 | A1 * | 7/2010 | Price | G02B 21/0016 359/381 |
| 2010/0188558 | A1 * | 7/2010 | Gamadia | H04N 5/23212 348/345 |
| 2010/0188588 | A1 * | 7/2010 | Sato | H04N 9/3111 348/744 |
| 2011/0293256 | A1 * | 12/2011 | Ishiwata | G02B 7/38 396/104 |
| 2011/0297915 | A1 * | 12/2011 | Tian | H01L 27/14603 257/21 |
| 2011/0298914 | A1 * | 12/2011 | Oshiro | G02B 21/245 348/79 |
| 2011/0303898 | A1 * | 12/2011 | Tian | H01L 27/14603 257/21 |
| 2011/0305388 | A1 * | 12/2011 | Wedi | G06T 5/005 382/165 |
| 2012/0037789 | A1 * | 2/2012 | Tian | H01L 27/14603 250/208.1 |
| 2012/0050562 | A1 * | 3/2012 | Perwass | H04N 5/2254 348/222.1 |
| 2012/0127297 | A1 * | 5/2012 | Baxi | G06T 7/0002 348/79 |
| 2012/0194903 | A1 | 8/2012 | Nishikawa | |

FOREIGN PATENT DOCUMENTS

| | | | | |
|---|---|---|---|---|
| JP | A-2001-330557 | | 11/2001 | |
| JP | A-2008-304808 | | 12/2008 | |
| JP | 2010217317 A | * | 9/2010 | ............ G02B 7/28 |
| JP | A-2010-217317 | | 9/2010 | |
| WO | WO 2011/007768 A1 | | 1/2011 | |

OTHER PUBLICATIONS

Lukes et al, MEMS mirror for flexible z-axis control in a commercial confocal microscope, 2012.*
Kaneko et al, Dynamic focusing lens for expanding depth of focus of optical microscope, 1996.*
Huang et al., "Three-Dimensional Super-Resolution Imaging by Stochastic Optical Reconstruction Microscopy," *Science*, Feb. 2008, vol. 319, pp. 810-813.
International Search Report issued in International Patent Application No. PCT/JP2012/050673 dated Mar. 13, 2012.
Office Action issued in Japanese Application No. 2012-553693 dated May 2, 2014 (with translation).
English-language translation of International Preliminary Report on Patentability issued in International Application No. PCT/JP2012/050673 dated Jul. 23, 2013.

* cited by examiner

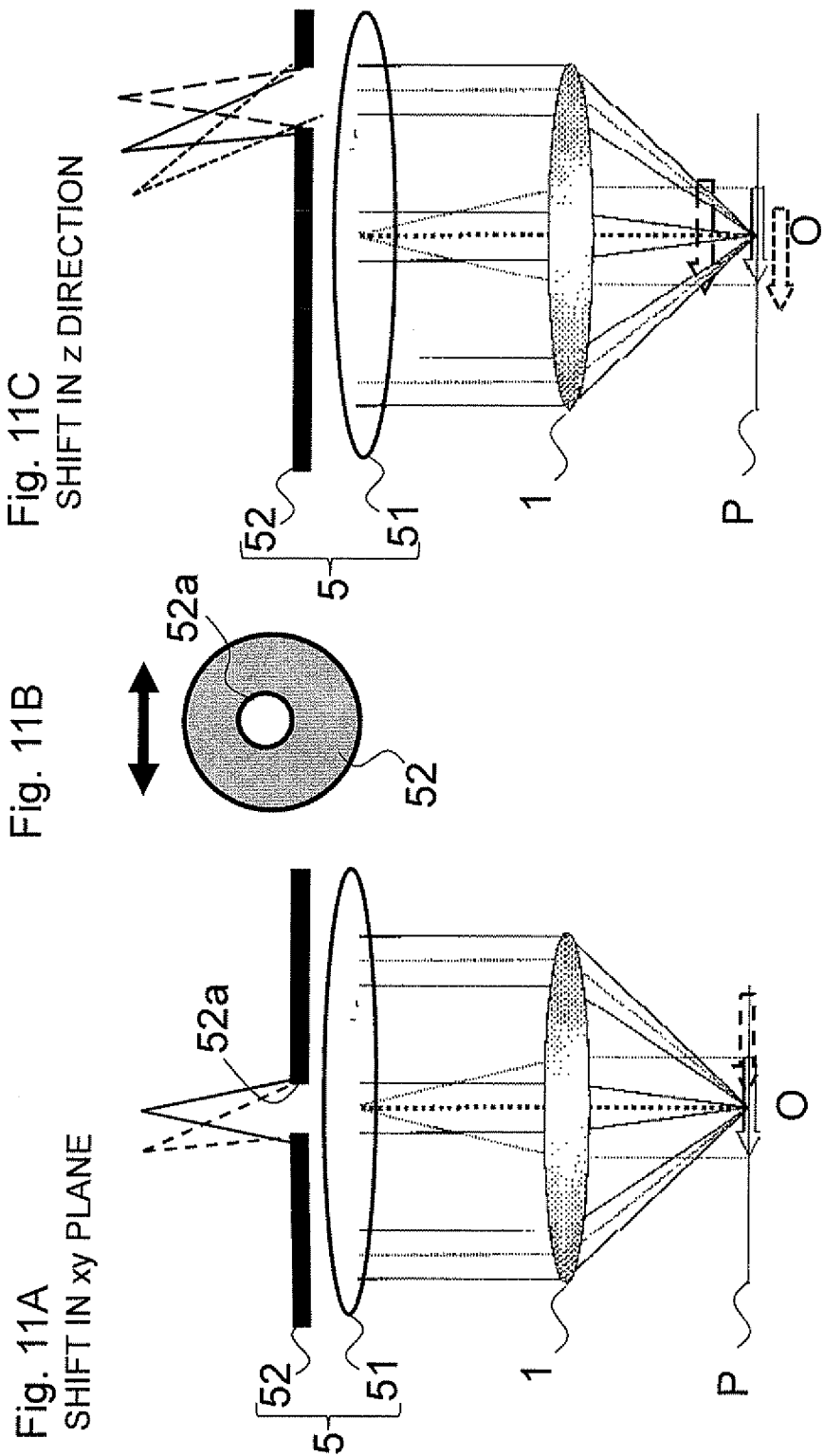

FOCUS POSITION MAINTAINING APPARATUS, AND MICROSCOPE

This is a Continuation of Application No. PCT/JP2012/050673 filed Jan. 16, 2012, which claims the benefit of Japanese Applications No. 2011-010445 filed Jan. 21, 2011 and 2011-230560 filed Oct. 20, 2011. The disclosure of the prior applications is hereby incorporated by reference herein in their entirety.

TECHNICAL FIELD

The present invention relates to a focus position maintaining apparatus and a microscope.

BACKGROUND ART

Autofocusing of related art used in an optical microscope is broadly classified into two methods: a passive method and an active method. In the passive method, a specimen is kept in focus, for example, by detecting a blur based on a change in the position where the contrast of an observed image of the specimen is maximized and performing feedback control on a z-axis stage or an objective lens drive unit to change the positional relationship between an objective lens and the specimen in the optical axis direction (z direction). When the specimen has low luminance or contrast, however, it takes time to perform the image analysis, resulting in a delay in focus adjustment or a focus error. On the other hand, the active method, a representative example of which is a slit projection method, is capable of quick focus adjustment because the z position of a specimen is detected based on reflection of infrared light or any other light with which the specimen (such as a cover slip) is irradiated. The two methods, however, which are capable of correcting a shift in the z direction, are not capable of correcting a shift in a direction perpendicular to the z direction (x and y directions).

Advances in super-resolution technologies and other similar technologies in recent years are drawing attention to microscopic observation in a nanometer scale, which is smaller than the resolution of an optical microscope. In observation in this resolution scale, a change in the position of a specimen being observed due, for example, to a mechanical drift of an apparatus and thermal expansion of the cover slip, which has not been a problem, can be an unignorable problem. It is therefore desired to develop a technology that allows the positional relationship between an objective lens and a specimen to be maintained three-dimensionally with precision. For example, in an apparatus described in Non-patent Literature 1, an active method is combined with image analysis for three-dimensional drift correction. In the apparatus, a z drift is corrected based on the active method, and x and y drifts and a residual z drift are corrected by analyzing time-lapse images.

CITATION LIST

Patent Literature

Non-Patent Literature 1: Bo Huang et al., "Three-Dimensional Super-Resolution Imaging by Stochastic Optical Reconstruction Microscopy," SCIENCE, The American Association for the Advancement of Science, Feb. 11, 2008, Vol. 319, pp. 810-813

SUMMARY OF INVENTION

Technical Problem

However, the image analysis method described in Non-patent Literature 1, in which a series of images are acquired and then a drift is corrected based on the image information, is problematic in that the focus position cannot be corrected in real time.

The present invention has been made in view of the problem described above, and an object of the present invention is to provide a focus position maintaining apparatus capable of maintaining the focal point of an objective lens in a desired position on a specimen by three-dimensionally correcting a shift of the specimen in real time and a microscope including the focus position maintaining apparatus.

Solution to Problem

To solve the problem described above, a focus position maintaining apparatus according to the present invention is a focus position maintaining apparatus that controls operation of a focus actuator that changes the positional relationship between a specimen and an objective lens to maintain the focal point of the objective lens in a desired position in the specimen and the apparatus includes an optical mechanism that is disposed in a position where the optical mechanism receives light from the specimen via the objective lens, divides the wavefront of the light, and forms images of the specimen, an imaging device disposed in a position where the imaging device receives light from the optical mechanism, and a control unit that outputs a signal for controlling the operation of the focus actuator based on the positions where the images of the specimen which are detected by the imaging device via the optical mechanism, and detects the amount and direction of shift of the specimen in a plane perpendicular to the optical axis of the objective lens based on the directions and amounts of shift of the positions where the images are formed.

In the focus position maintaining apparatus described above, the optical mechanism is preferably disposed in a position substantially conjugate with an exit pupil of the objective lens.

In the focus position maintaining apparatus described above, the optical mechanism is preferably a micro-optic array formed of a plurality of unit lenses.

In the focus position maintaining apparatus described above, the optical mechanism preferably includes an image forming optical system and a mechanism capable of acquiring both of a light flux containing the optical axis of the objective lens and other light fluxes.

In the focus position maintaining apparatus described above, the optical mechanism preferably includes a mechanism that has an opening and acquires a light flux containing the optical axis of the objective lens and other light fluxes alternately by moving the opening.

In the focus position maintaining apparatus described above, the imaging device is preferably disposed in a focus position of the plurality of unit lenses that form the micro-optic array.

In the focus position maintaining apparatus described above, the optical axis of a predetermined unit lens among the plurality of unit lenses that form the micro-optic array preferably substantially coincides with the optical axis of the objective lens.

In the focus position maintaining apparatus described above, the control unit preferably detects the amount and direction of shift of the specimen along the optical axis of the objective lens based on the direction and amount of shift of the image of the specimen formed by the unit lens located in a position shifted from the optical axis of the objective lens among the images of the specimen formed by the unit lenses of the micro-optic array.

In the focus position maintaining apparatus described above, the control unit preferably detects the amount and direction of shift of the specimen in a plane perpendicular to the optical axis of the objective lens based on the direction and amount of shift of the image of the specimen formed by the unit lens located on the optical axis of the objective lens among the images of the specimen formed by the unit lenses of the micro-optic array.

In the focus position maintaining apparatus described above, the control unit preferably detects the amount and direction of shift of the specimen along the optical axis of the objective lens based on the direction and amount of shift of an image formed with a light flux other than the light flux containing the optical axis of the objective lens.

In the focus position maintaining apparatus described above, the control unit preferably detects the amount and direction of shift of the specimen in a plane perpendicular to the optical axis of the objective lens based on the direction and amount of shift of an image formed with the light flux containing the optical axis of the objective lens.

The focus position maintaining apparatus described above preferably further includes a projection unit that projects a pattern on the specimen via the objective lens, and the control unit preferably detects the amount and direction of shift of the specimen by using an image of the pattern.

A microscope according to the prevent invention is characterized in that the microscope includes an objective lens, a focus actuator that changes the positional relationship between a specimen and the objective lens, and any one of the focus position maintaining apparatus described above.

Advantageous Effects of Invention

According to the present invention, the focal point of an objective lens can be maintained in a desired position in a specimen by three-dimensionally correcting a shift of the specimen in real time.

BRIEF DESCRIPTION OF DRAWINGS

FIG. 11 is a descriptive diagram for describing a case where an optical mechanism in the focus position maintaining apparatus is formed of an image forming optical system and a diaphragm, FIG. 11(a) showing a case where a change in the position of a specimen in an xy plane is detected, FIG. 11(b) showing the shapes of the diaphragm and an opening, and FIG. 11(c) showing a case where a change in the position of the specimen in the z direction is detected.

DESCRIPTION OF EMBODIMENT

Figure 1:
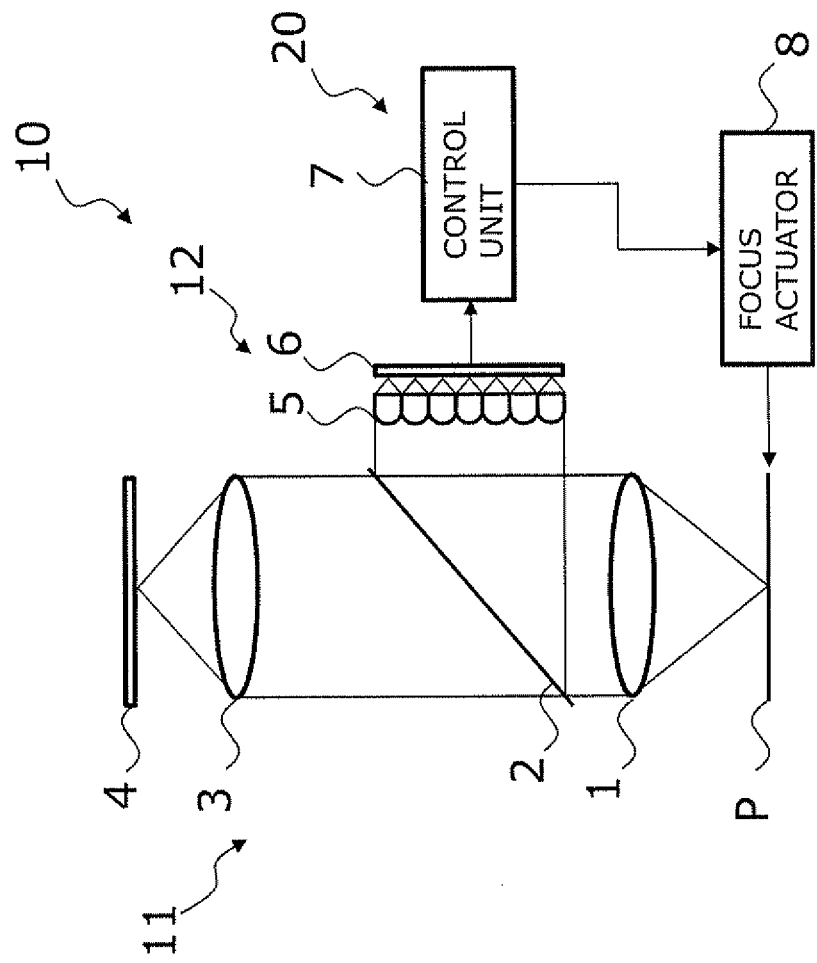
FIG. 1 is a descriptive diagram showing the configuration of an optical system and a control system of a microscope including a focus position maintaining apparatus.

A preferable embodiment of the present invention will be described below with reference to the drawings. A description will first be made of the configuration of a microscope including a focus position maintaining apparatus according to the present embodiment with reference to FIG. 1. The optical system of a microscope 10 includes an observation optical system 11, which forms an image of a specimen plane P onto an observation imaging device 4, and a focus optical system 12, which extends sideways from the observation optical system 11 and is part of a focus position maintaining apparatus 20, which maintains the focal point of an objective lens 1 provided in the observation optical system 11 in a desired position in the specimen.

The observation optical system 11 includes the objective lens 1, a half-silvered mirror 2, an image forming lens 3, and the observation imaging device 4 sequentially arranged from the side where the specimen is present. The focus optical system 12, which shares the objective lens 1 and the half-silvered mirror 2 with the observation optical system 11, further includes, sequentially from the side where the half-silvered mirror 2 is present, an optical mechanism 5, which is disposed in a position where it receives light from the specimen via the objective lens 1, divides the wavefront of the light, and forms images of the specimen, and a focus imaging device 6, which is disposed in a position where it receives light from the optical mechanism 5. Light having exited out of the specimen located in the focal plane of the objective lens 1 is converted into substantially collimated light by the objective lens 1, passes through the half-silvered mirror 2, is then focused by the image forming lens 3 onto the imaging surface of the observation imaging device 4, and forms an image of the specimen. That is, the half-silvered mirror 2 is disposed in the space between the objective lens 1 and the image forming lens 3, where an afocal light flux travels. Alternatively, an image of the specimen can be directly observed by replacing the observation imaging device 4 with an ocular lens.

The optical mechanism 5 in the focus position maintaining apparatus 20 according to the present embodiment is a micro-optic array having a plurality of tiny optical elements arranged two-dimensionally. In the present embodiment, in particular, a microlens array having a plurality of unit lenses (microlenses) arranged two-dimensionally is used. The microlens array functions as an optical element in which the wavefront of incident light is divided by the unit lenses. The optical mechanism is therefore called a microlens array 5 in the following description. Further, the focus imaging device 6 has a plurality of pixels arranged two-dimensionally.

Figure 2:
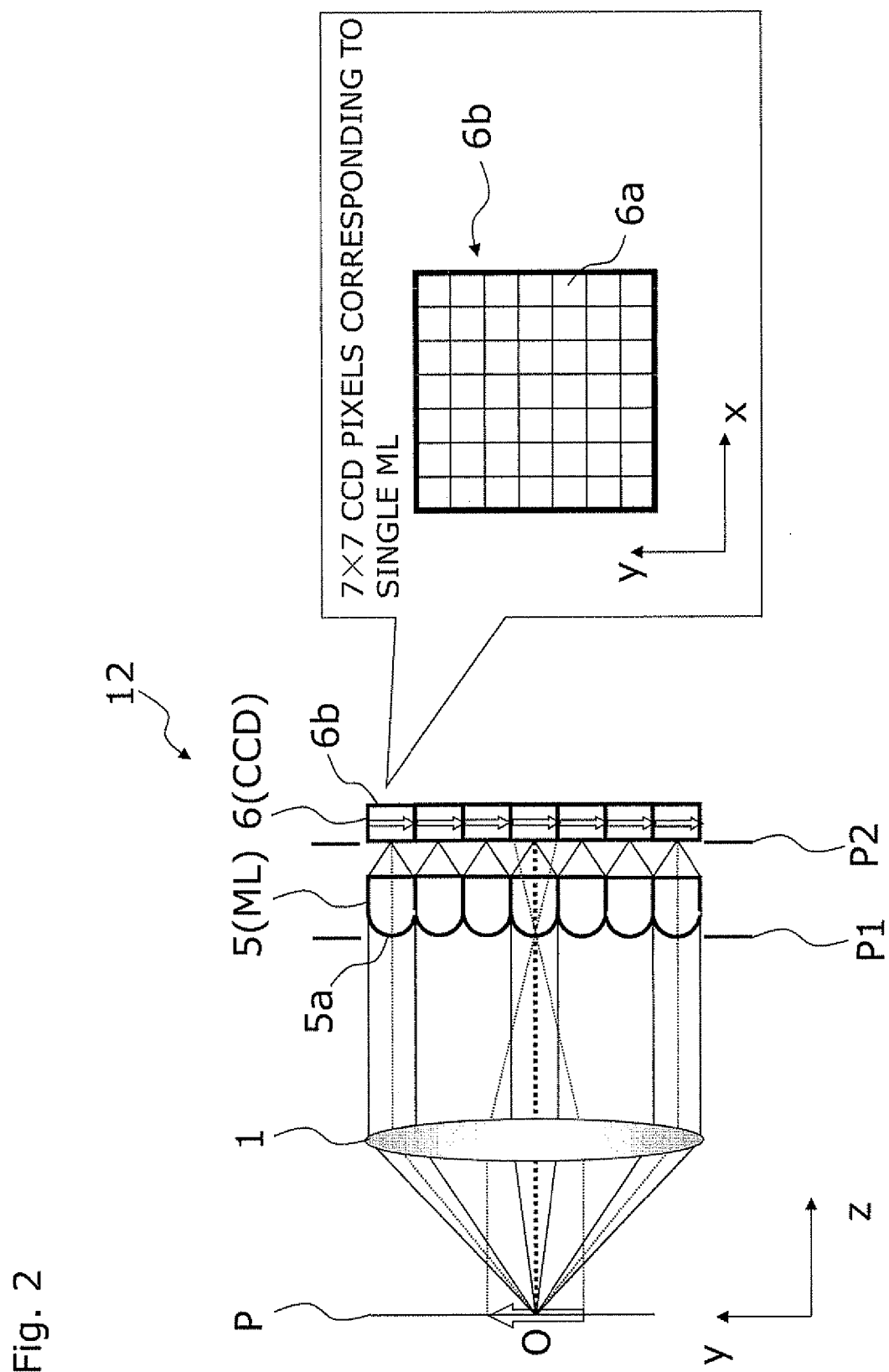
FIG. 2 is a descriptive diagram showing an optical system of the focus position maintaining apparatus.

The configuration of the focus optical system 12 in the focus position maintaining apparatus 20 will now be described with also reference to FIG. 2. In FIG. 2, the half-silvered mirror 2 is not shown. In the focus optical system 12, the microlens array 5 is so disposed that it substantially coincides with an exit pupil plane P1 of the objective lens 1 (or a plane conjugate with exit pupil plane P1). The focus imaging device 6 is so disposed that the imaging surface thereof substantially coincides with an image-side focal plane P2 of the microlens array 5. The image-side focal plane P2 of the microlens array 5 and the object-side focal plane (specimen plane P) of the objective lens 1 are therefore conjugate with each other.

The unit lenses 5a of the microlens array 5, which is disposed in the exit pupil plane P1 of the objective lens 1, divide the exit pupil thereof. Therefore, when the microlens array 5 is formed of N×N unit lenses 5a, a numerical aperture (NA) representing each of the unit lenses 5a that subtends an object (specimen plane P) is reduced to 1/N based on the aperture determined by the diameter of the unit lens 5a. Each of the unit lenses 5a therefore has a very large depth of field and provides a substantially focused image irrespective of the depth of the specimen or what is called an omnifocal image in the focus optical system 12 according to the present embodiment.

Assuming now that the optical axis direction is called a z direction and directions perpendicular to each other in a plane perpendicular to the z direction are called x and y directions as shown in FIG. 2, the focus position maintaining apparatus 20 according to the present embodiment is configured to detect shifts of the specimen in the x, y, and z directions relative to the objective lens 1 based on a change in the position of a plane where an image of the specimen in a predetermined position thereof is formed by each of the unit lenses 5a of the microlens array 5. To this end, the focus position maintaining apparatus 20 further includes a control unit 7, which outputs a control signal that operates a focus actuator 8 in the microscope 10 in such a way that the focal point of the objective lens 1 is maintained in a desired position in the specimen based on an image outputted from the focus imaging device 6. The focus actuator 8 can be a movement mechanism that moves a stage on which the specimen is mounted in the z direction as well as the x and y directions. Further, the focus imaging device 6, which detects a displacement of an image formed by each of the unit lenses 5a of the microlens array 5, is so configured that a plurality of pixels 6a are allocated for an image formed by each of the unit lenses 5a. For example, in the case shown in FIG. 2, 7×7 pixels are allocated as pixels 6a of the focus imaging device 6 that correspond to a single unit lens 5a. In the following description, the set of pixels 6a corresponding to each of the unit lenses 5a is called a pixel group 6b.

Figure 7:
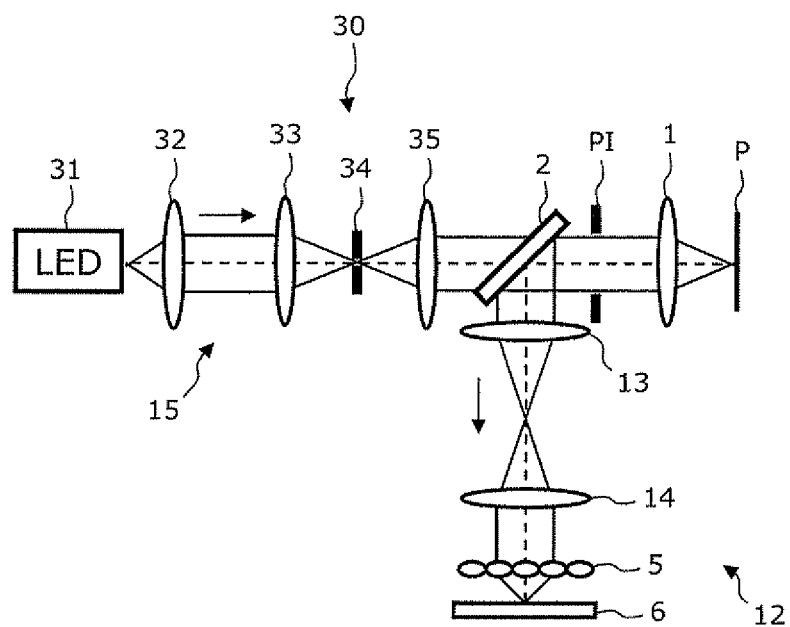
FIG. 7 is a descriptive diagram showing the configuration of a projection unit that projects a pattern on a specimen.

The term "specimen" used in the following description may be a specimen itself observed under the microscope 10, a marker for position correction (fluorescent beads, for example), or a specific pattern projected on a specimen through a projection unit 30 shown in FIG. 7. The pattern is desirably, for example, an image of a pinhole having an appropriate size. The projection unit 30 in FIG. 7 includes, for example, a light source 31, which emits focus illumination light, and an illumination optical system 15, which irradiates the specimen with the illumination light from the light source 31. The illumination optical system 15 includes a first collector lens 32, which converts the illumination light from the light source 31 into substantially collimated light, a second collector lens 33, which focuses the substantially collimated light, a light blocking plate 34, which has a pinhole and is so disposed that an image of the light source 31 formed by the second collector lens 33 substantially coincides with the pinhole, and a third collector lens 35, which converts the illumination light having passed through the pinhole into substantially collimated light. The illumination light having exited out of the third collector lens 35 passes through the half-silvered mirror 2 and impinges on the specimen plane P via the objective lens 1. The configuration for detecting the illumination light reflected off the specimen plane P is the same as the configuration of the focus optical system 12 described above. It is, however, noted in FIG. 7 that a first relay lens 13 and a second relay lens 14, which relay an image of the exit pupil plane P1 of the objective lens 1, are provided, and that the microlens array 5 is so disposed that it substantially coincides with the image of the exit pupil plane P1 formed by the first relay lens 13 and the second relay lens 14, (the microlens array 5 is disposed in a position substantially conjugate with the exit pupil plane P1). The image forming lens 3 and the observation imaging device 4, which form the observation optical system 11, are not shown in FIG. 7. A pinhole image projected on the focus imaging device 6 is desirably larger than the size of a single pixel 6a of the focus imaging device 6. Further, the illumination light may be coherent light or incoherent light. It is further desirable that the optical axis of one of the unit lenses 5a (typically, unit lens 5a located at the center), which form the microlens array 5, substantially coincides with the optical axis of the objective lens 1.

Figure 3:
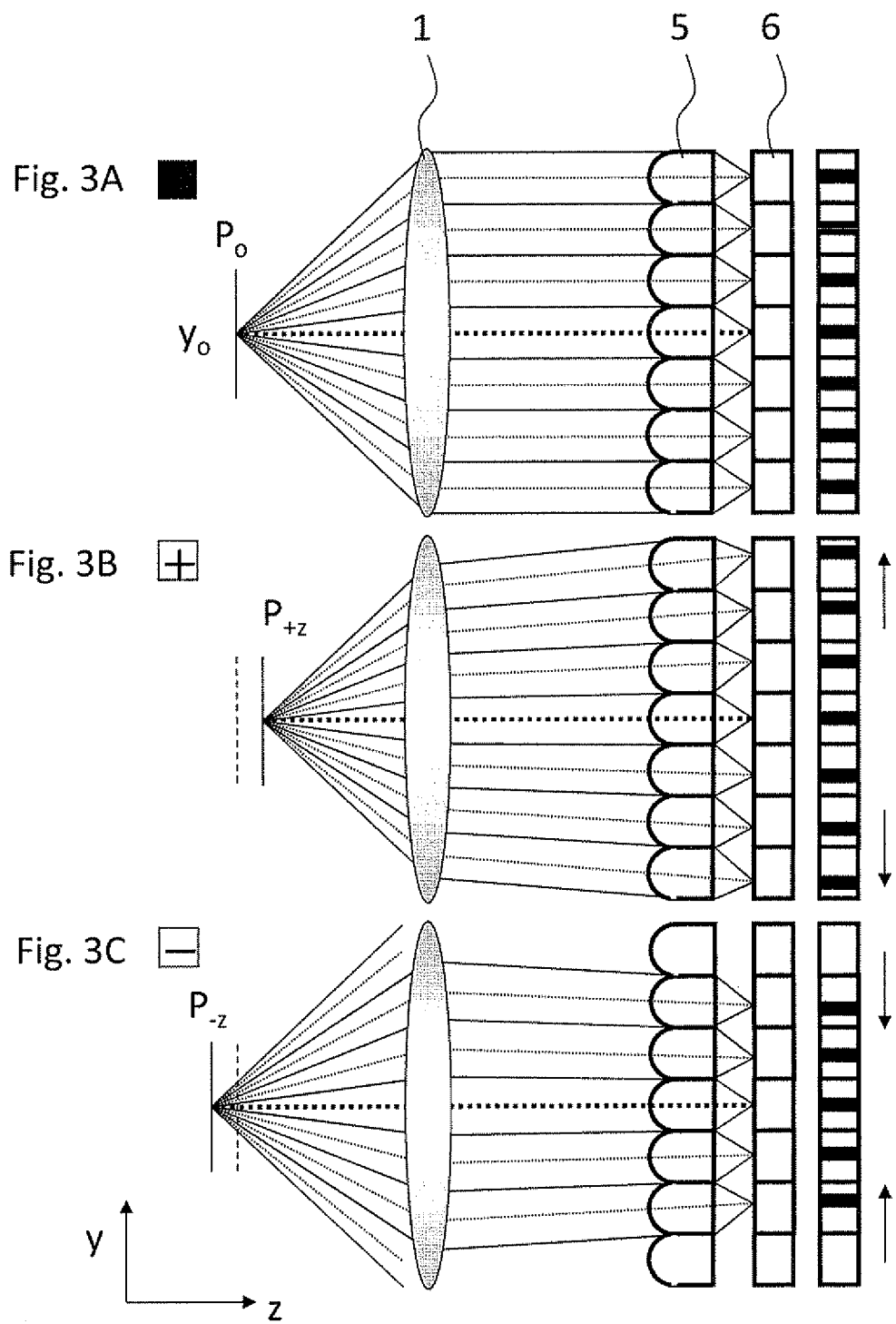
FIG. 3 is a descriptive diagram showing images formed when a specimen is shifted in a z direction relative to an objective lens, FIG. 3(a) showing a case where a desired position in the specimen coincides with the focal plane of the objective lens, FIG. 3(b) showing a case where the specimen is shifted toward the objective lens, and FIG. 3(c) showing a case where the specimen is shifted away from the objective lens.
Figure 4:
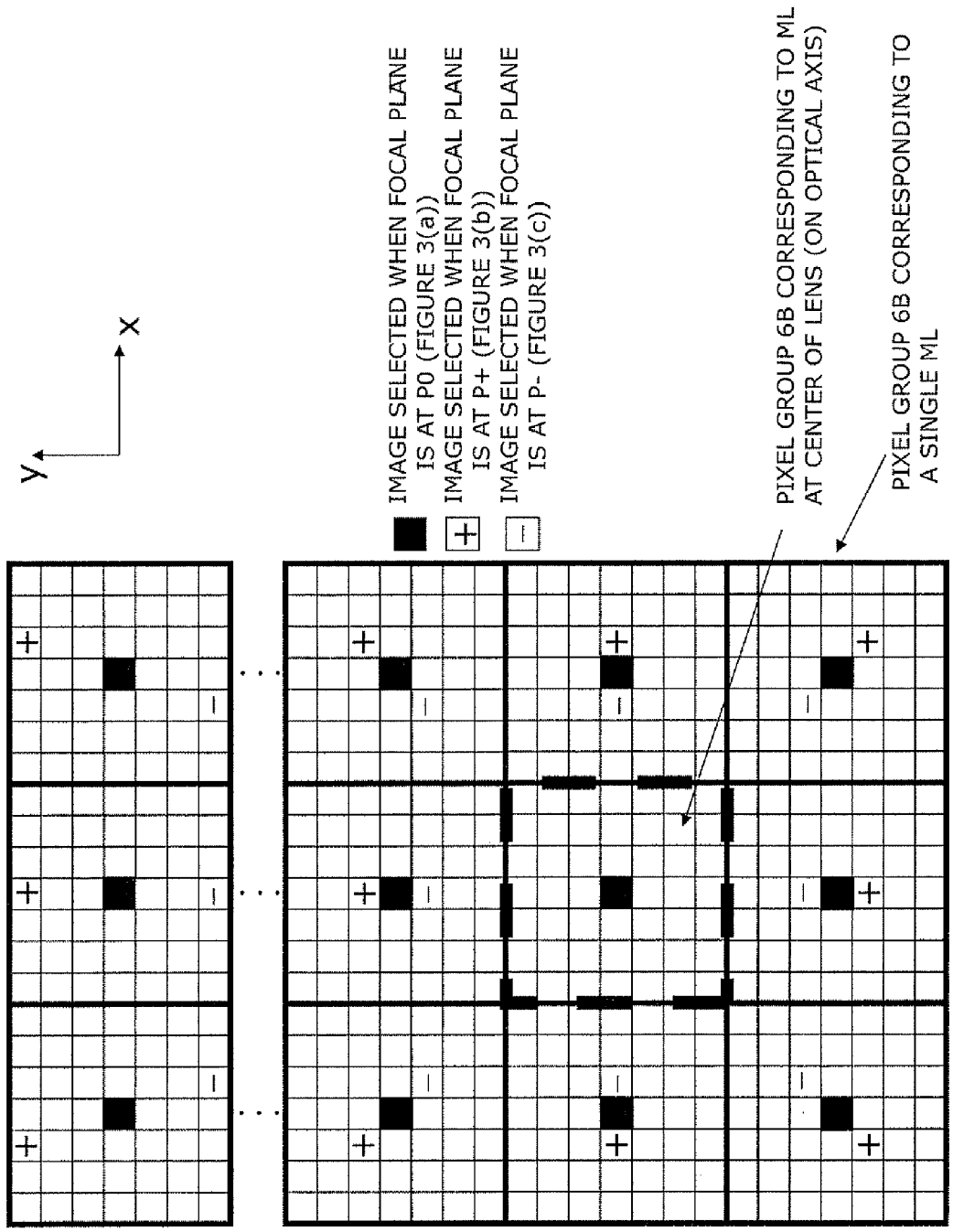
FIG. 4 is a descriptive diagram showing images formed by a microlens array in the state shown in FIG. 3.

A description will now be made of a change in images formed by the microlens array 5 in a case where the positional relationship between the objective lens 1 and a specimen changes. A description will first be made of a case where the positional relationship changes in the z direction with reference to FIGS. 3 and 4. FIG. 3 shows light having exited out of an on-axis point O in the specimen, and FIG. 3(a) shows a case where the focal plane of the objective lens 1 coincides with the specimen plane. That is, the point O described above is located in the focal plane of the objective lens 1 (the state is called a state $P_0$). In this state, an image of the point O formed by each of the unit lenses 5a of the microlens array 5 is formed substantially at the center of the pixel group 6b corresponding to the unit lens 5a, as shown in FIG. 4.

On the other hand, when no change occurs in the x or y direction but the specimen plane approaches in the z direction toward the objective lens 1 (the state is called a state $P_{+z}$), the position of an image of the point O formed by the unit lens 5a the optical axis of which coincides with the optical axis of the objective lens 1 does not change, whereas the positions of images of the point O formed by the off-axis unit lenses 5a are shifted outward symmetrically with respect to the center of the image formed by the on-axis unit lens 5a, as shown in FIG. 3(b). In this case, the amount of shift of the image increases with distance from the optical axis to an off-axis unit lens 5a. Further, when no change occurs in the x or y direction but the specimen plane is shifted in the z direction away from the objective lens 1 (the state is called a state $P_{-z}$), the position of an image of the point O formed by the unit lens 5a, the optical axis of which coincides with the optical axis of the objective lens 1 does not change, whereas the positions of images of the point O formed by the off-axis unit lenses 5a are shifted inward symmetrically with respect to the center of the image formed by the on-axis unit lens 5a, as shown in FIG. 3(c). In this case as well, the amount of shift of the image increases with distance from the optical axis to an off-axis unit lens 5a.

As described above, in the present method, a change in the position of a specimen in the optical axis direction (z direction) is detected as changes in the position where images are formed on the focus imaging device 6. In this process, an image formed by each of the unit lenses 5a of the microlens array 5 has a large depth of field and can be considered as an omnifocal image. The shape of a point spread function of the image therefore hardly changes even when the specimen is shifted in the optical axis direction as shown in FIGS. 3(b) and 3(c). As a result, the intensity of the point spread function hardly decreases due to defocus, whereby the position where the intensity peaks can be precisely calculated with a satisfactory noise-to-signal ratio maintained.

A description will next be made of a case where the positional relationship changes in a plane perpendicular to the z direction with reference to FIGS. 5 and 6 (the description below will be made of a case where the positional relationship changes in the y direction, and the same holds true for a case where the positional relationship changes in the x direction). First, when the focal plane of the objective lens 1 coincides with the specimen plane, the state in which the light having exited out of the on-axis point O in the specimen is focused (state $P_0$ described above) is the same as that shown in FIG. 4 described above. That is, an image of the point O formed by each of the unit lenses 5a of the microlens array 5 is formed substantially at the center of the pixel group 6b corresponding to the unit lens 5a.

Figure 5A:
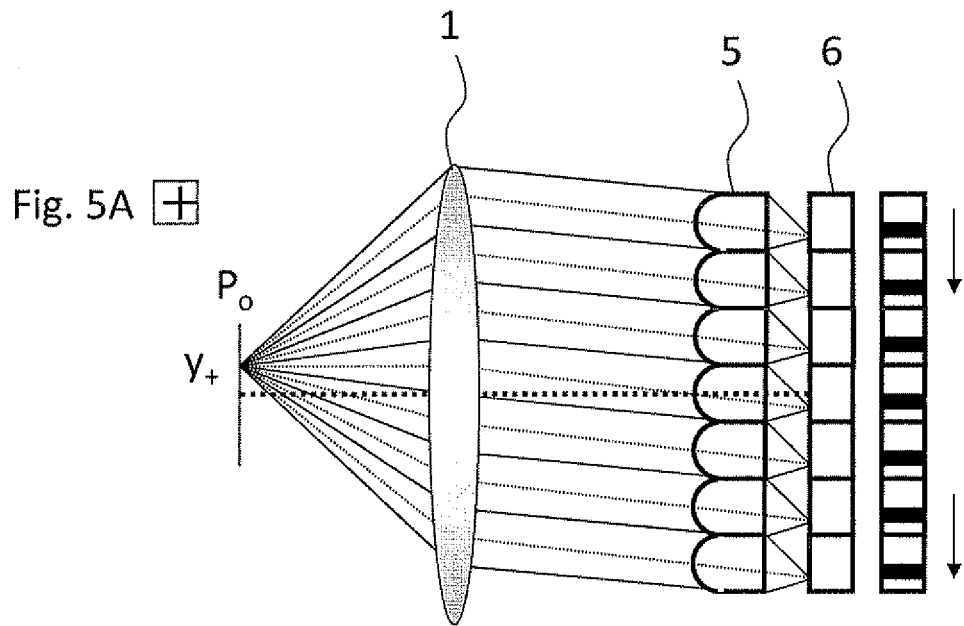
FIG. 5 is a descriptive diagram showing images formed when a specimen is shifted in a y direction relative to the objective lens, FIG. 5(a) showing a case where the specimen is shifted in one of the right and left directions and FIG. 5(b) showing a case where the specimen is shifted in the other direction.
Figure 5B:
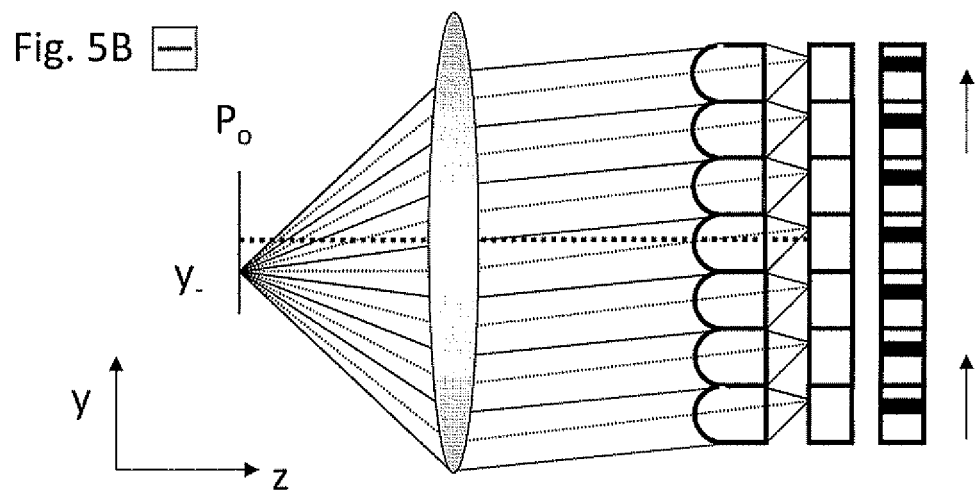
Figure 6:
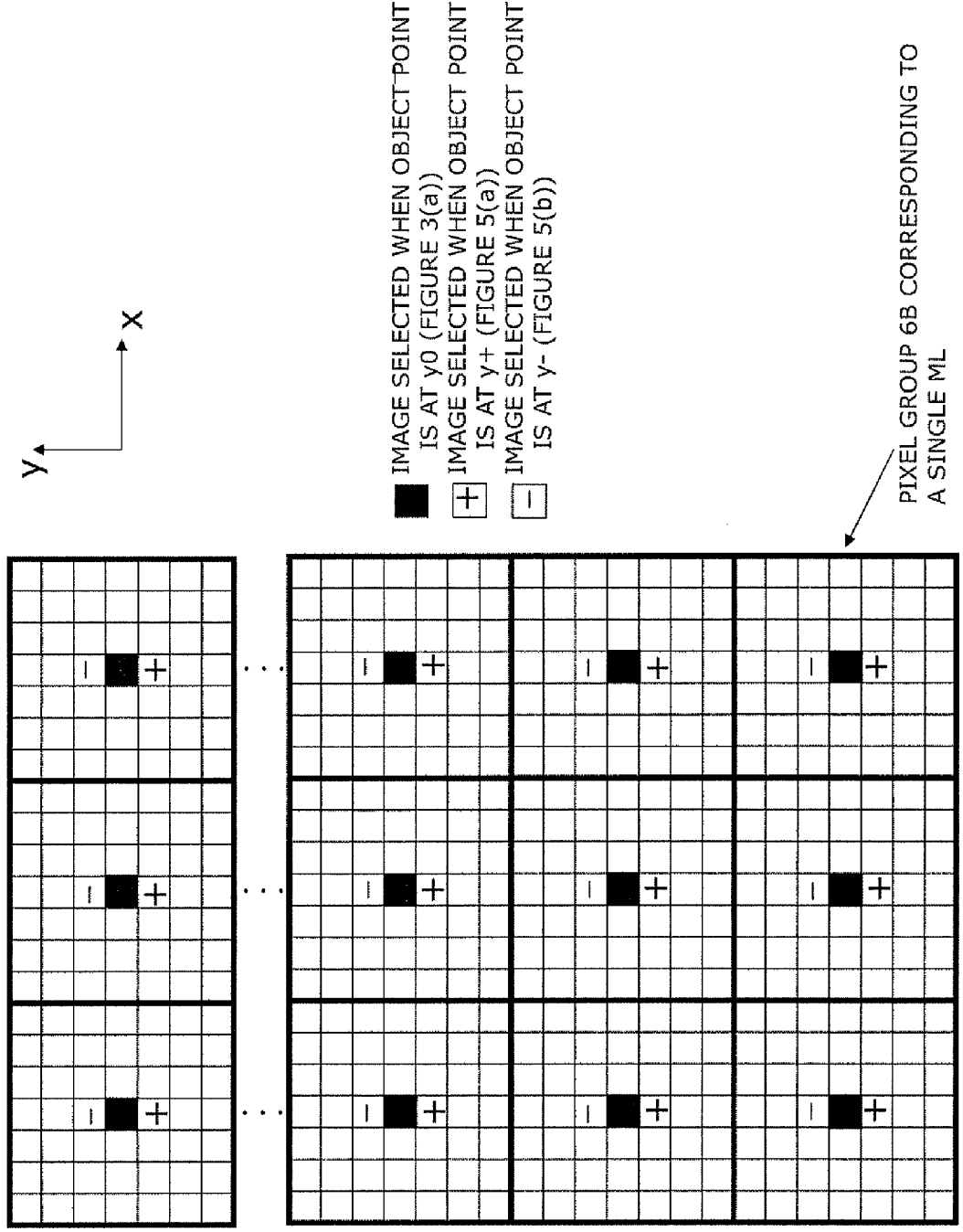
FIG. 6 is a descriptive diagram showing images formed by the microlens array in the state shown in FIG. 5.

On the other hand, when the point O in the specimen is shifted in the y direction with respect to the optical axis of the objective lens 1, the image formed in each of the pixel groups 6b of the focus imaging device 6 is also shifted in the y direction, as shown in FIGS. 5(a) and 6(a). In this process, the direction in which the image of the point O is shifted from the center of each of the pixel groups 6b is opposite to the direction in which the point O is shifted relative to the objective lens 1. The amounts of shift of the images of the point O in the pixel groups 6b are substantially the same (the images of the point O are formed in the same position in the pixel groups 6a).

As described above, when the specimen is shifted in a transverse (x, y) direction (shifted in a direction perpendicular to the optical axis), images of the point O are formed in the same position in the pixel groups 6b corresponding to the unit lenses 5a. On the other hand, when the specimen is shifted in the optical axis (z) direction, the on-axis unit lens 5a always forms the image in the same position, whereas the other unit lenses 5a form the images in positions shifted symmetrically with respect to the center (point of symmetry) of the optical axis of the objective lens 1. In this process, the amount of shift increases with distance to an off-axis unit lens 5a.

Therefore, when the focal point of the objective lens 1 is in a desired position in a specimen, the control unit 7 in the focus position maintaining apparatus 20 stores an image of an on-axis point in the focal plane of the objective lens 1 (hereinafter referred to as reference point). That is, an image of the reference point is formed at the center of each of the pixel groups 6b of the imaging device 6. When the control unit 7 determines that the image of the reference point has been shifted within each of the pixel groups 6b and the specimen has been shifted in any of the x, y, and z directions, the control unit 7 first computes information on the shifts in the x and y directions based on the direction and amount of the shift of the image in the pixel group 6b corresponding to the on-axis unit lens 5a and then performs feedback control on the focus actuator 8 in the microscope 10 in terms of the x and y coordinates based on the information to position the reference point on the optical axis of the objective lens 1 in the xy plane (to position the image detected by the central pixel group 6b substantially at the center of the pixel group 6b). The control unit 7 then computes information on the shift in the z direction based on the direction and amount of shift of the image in any of the pixel groups 6b corresponding to the unit lenses 5a that are not located on the optical axis of the objective lens 1 and performs feedback control on the focus actuator 8 in terms of the z coordinate to shift the reference point to the optical axis of the objective lens 1 in the focal plane thereof (in such a way that the image detected by each of the pixel groups 6b is positioned substantially at the center of the pixel group 6b). The three-dimensional drift of the specimen can thus be corrected. To sense a shift of a specimen in the z direction, it is preferable to use an image formed by a unit lens 5a far away from the optical axis of the objective lens 1, which will be described later in detail, because the pixel shift in response to the shift of the specimen along the optical axis (z direction) is large and the accuracy in position detection increases.

As described above, when the control unit 7 performs the feedback control on the operation of the focus actuator 8 in such a way that the position of an image of the reference point in each of the pixel groups 6b of the focus imaging device 6 is maintained at the center of the pixel group 6b, a positional shift of a specimen relative to the objective lens 1 can be corrected three-dimensionally in real time, whereby the focal point of the objective lens 1 can be always maintained in a desired position in the specimen.

In the thus configured focus position maintaining apparatus 20, assume that an object point is on the optical axis and no defocus occurs as shown in FIG. 3(a). In this case, each of the unit lenses 5a of the microlens array 5 forms an image of the object point at the center of the pixel group 6b of the focus imaging device 6 that corresponds to the unit lens 5a. As described above, the focus imaging device 6 has a plurality of pixels 6a arranged two-dimensionally, and the pixel groups 6b, each of which is formed of a plurality of the pixels 6a, are allocated for the respective unit lenses 5a of the microlens array 5, as shown in FIGS. 2 and 8 (for example, 7×7=49 pixels 6a are allocated for each of the unit lenses 5a as shown in FIG. 2). Provided that the optical axis of each of the unit lenses 5a passes through the center of the corresponding pixel group 6b, and that the coordinates of the center of the pixel group 6b are (xlo,ylo)=(0,0), the image formation positions in all the pixel groups 6b are (xlo,ylo) =(0,0) if there is no defocus, as indicated by filled pixels 6a in FIG. 4.

Consider now the displacement of the image formation position in each of the pixel groups 6b of the focus imaging device 6 in a case where the positional relationship between the objective lens 1 and a specimen changes in the y direction in a plane perpendicular to the z direction as in the above description (since the x and y directions are isotropic, the displacement of the image formation position in the x direction can be treated in the same manner). First, let $D_0$ represent the diameter of the pupil of the objective lens 1 and N represent how much the pupil of the objective lens 1 is divided by the unit lenses 5a of the microlens array 5. That is, it is assumed that the pupil of the objective lens 1 is divided by N×N unit lenses 5a. Further assuming that the unit lenses 5a are numbered (order m) as 1, 2, ..., N−1, N from the +y side toward the −y side in FIG. 2, a central position $h_m$ of the m-th unit lens 5a is expressed by the following Expression (1):

$$h_m = D_0 \left[ \frac{1}{2} - \frac{1}{N}\left(m - \frac{1}{2}\right) \right] \quad (1)$$

Figure 8B:
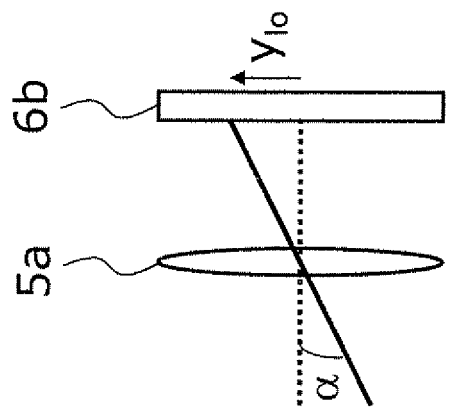
FIG. 8 is a descriptive diagram showing the positions of images of a specimen formed by the microlens array, FIG. 8(a) showing the relationship of the objective lens, the microlens array, and a focus imaging device and FIG. 8(b) showing the relationship between a unit lens and a pixel group.
Figure 8A:
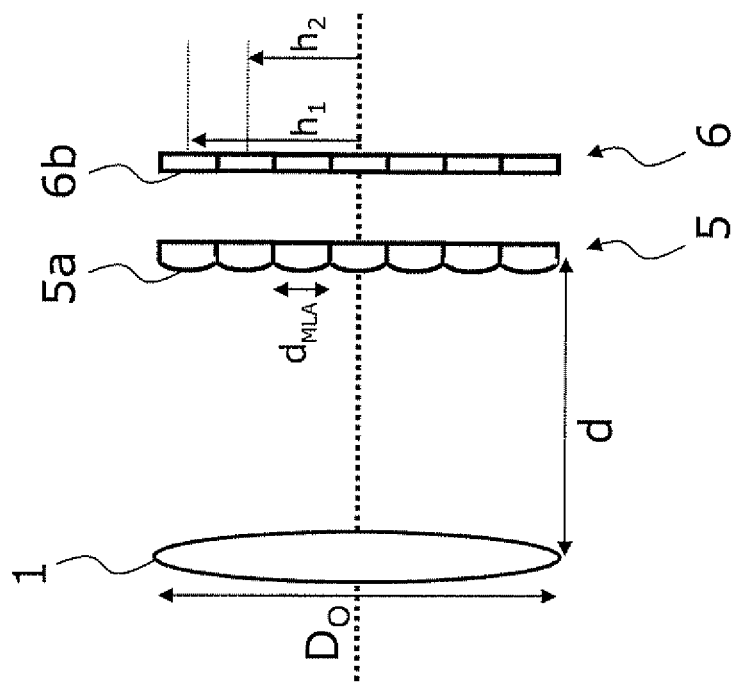

FIG. 8(a) shows the central positions $h_1$ and $h_2$ for m=1 and m=2, that is, the central positions of images formed by the outermost unit lens on the +y side and the unit lens immediately inward from the outermost unit lens. It is noted that the number of division N is desirably an odd number because it is desirable that the optical axis of the objective lens 1 coincides with the optical axis of any of the unit lenses 5a of the microlens array 5. In this case, when m=(N+1)/2, $h_m$=0 or the optical axis of the m-th unit lens 5a coincides with the optical axis of the objective lens 1. It is noted in this case that the origin of the central position $h_m$ is on the optical axis of the objective lens 1 and the coordinate system is defined differently from that defining (xlo,ylo) described above. That is, when the focal plane of the objective lens 1 and the specimen plane coincide with each other (when no shift is present), $h_m$ corresponding to the order m corresponds to ylo=0 in each of the unit lenses 5a as described above.

Now, look at a single unit lens 5a and the pixel group 6b corresponding thereto as shown in FIG. 8(b), and let $f_{MLA}$ be the focal length of the unit lens 5a, a be the angle between the direction of light passing through the center of the unit lens 5a and the optical axis of the unit lens 5a, and d be the distance between the objective lens 1 and the microlens array 5. The position ylo of an image formed by the m-th unit lens 5a is expressed by the following Expression (2):

$$y_{lo} = f_{MLA} \times \tan\alpha = f_{MLA} \times \tan\left[\sin^{-1}\left(-\frac{h_m}{S' - d}\right)\right] \quad (2)$$

In Expression (2), S' represents the position of an image point of the objective lens 1 and expressed by the following Expression (4) by using S representing the position of an object point of the objective lens 1 and expressed by the following Expression (3) where $f_{OB}$ represents the focal length of the objective lens 1 and dz represents defocus:

$$S = -f_{OB} + dz \quad (3)$$

$$S' = \frac{S \times f_{OB}}{S + f_{OB}} \quad (4)$$

Since dz=0 when there is no defocus, the position of the image point S' in Expression (4) diverges to infinity. That is, the light having exited out of the objective lens 1 is collimated light.

Consider now the resolution of the focus position maintaining apparatus 20 in the optical axis direction (z direction). To achieve high resolution, it is desirable that the image formation position ylo is displaced by a large amount in response to defocus of the objective lens 1. To this end, the number of division N of the microlens array 5 may be increased, and the displacement Δylo of the image formation position in the first or N-th unit lens 5a may be detected.

Figure 9A:
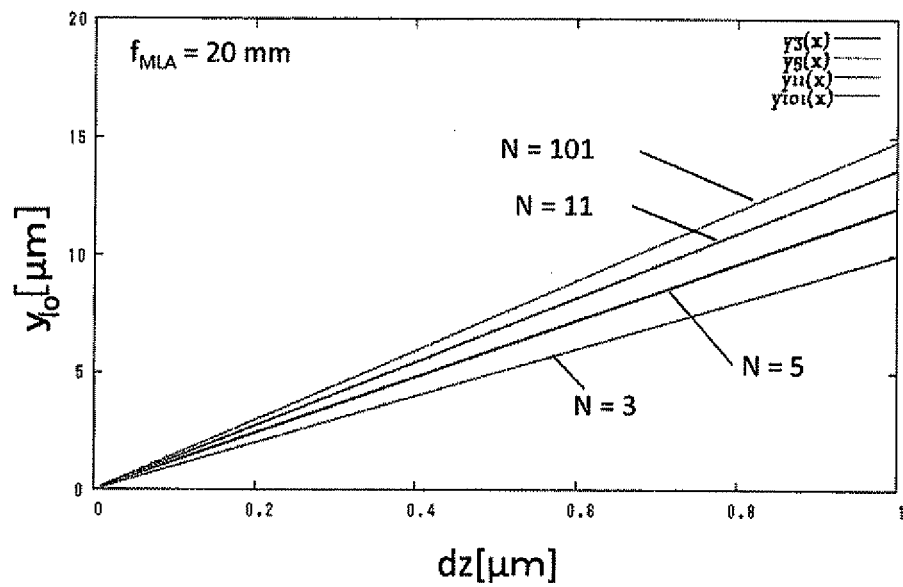
FIG. 9 shows graphs illustrating the relationship between the amount of defocus and the image formation position, FIG. 9(a) showing the relationship in a case where the number of division is changed and FIG. 9(B) showing the relationship in a case where the focal length of the unit lens is changed.
Figure 9B:
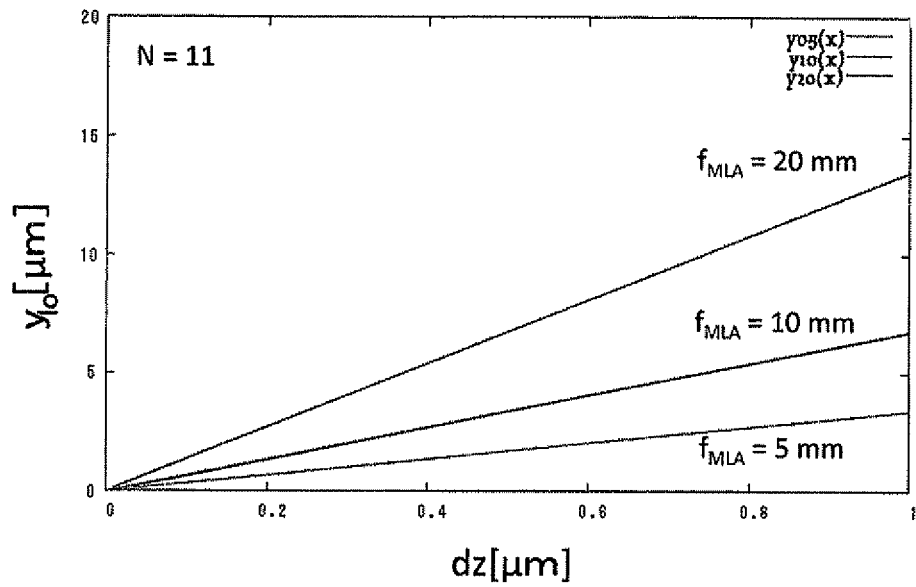

FIG. 9 shows the relationship between the defocus dz and the image formation position ylo where the first unit lens 5a forms an image. FIG. 9(a) shows the relationship obtained when the focal length $f_{MLA}$ of the unit lens 5a is set at 20 mm and the number of division N is set at the following four values: 3; 5; 11; and 101. FIG. 9(b) shows the relationship obtained when the number of division N is set at 11 and the focal length $f_{MLA}$ of the unit lens 5a is set at 5, 10, and 20 mm. FIGS. 9(a) and 9(b) show that a greater focal length $f_{MLA}$ of the unit lens 5a and/or a greater number of division N allows higher-resolution detection of the image formation position against defocus. Further, to achieve high-resolution detection of the image formation position, the size of the pixels 6a, which form the focus imaging device 6, is desirably small.

Figure 10:
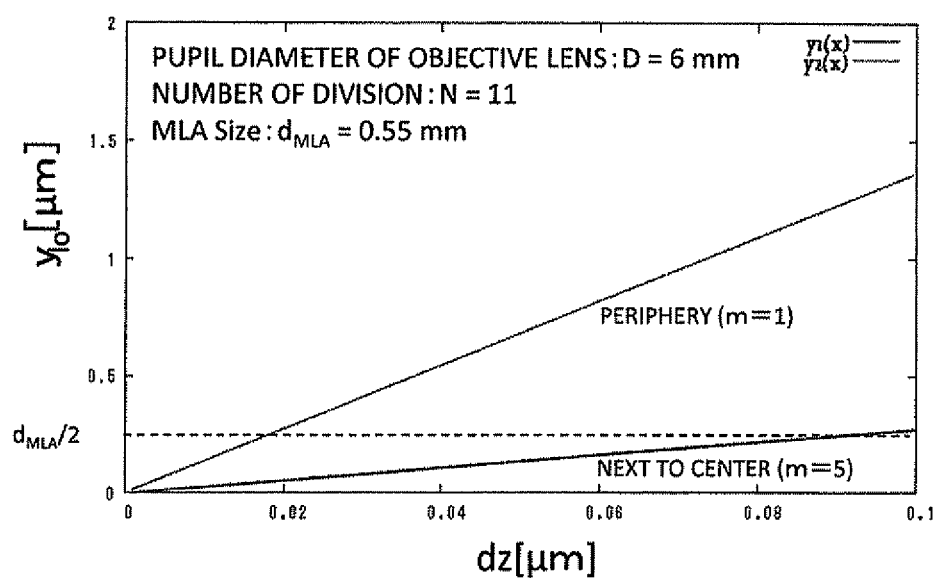
FIG. 10 shows graphs illustrating the relationship between the amount of defocus and the image formation position for unit lenses in different positions.

Consider next a detectable range. The amount of change in the image formation position in each of the pixel groups 6b of the focus imaging device 6 in response to a change in the positional relationship between the objective lens 1 and a specimen in the z direction increases with distance from the optical axis to a unit lens 5a. FIG. 10 shows the difference in the amount of change described above. FIG. 10 specifically shows the relationship between the defocus dz and the image formation position ylo obtained when the number of division. N is set at 11 and the unit lens 5a for m=1 (unit lens farthest from optical axis) and the unit lens for m=5 (unit lens adjacent to on-axis unit lens) are considered. To achieve a wide detectable range over which the image formation position ylo is detectable, it is desirable to use the unit lens 5a which is located next to the on-axis unit lens 5a and where the amount of displacement is small (because the position of an image formed by the on-axis unit lens (m=6) is not displaced in response to defocus).

As described above, in the focus position maintaining apparatus 20 according to the present embodiment, high resolution and a wide detectable range can both be achieved by selecting a unit lens 5a used in a desired process (that is, selecting a detection result obtained from a pixel group 6b corresponding to the unit lens 5a). High resolution and a wide detectable range are not achieved simultaneously in typical observation.

Consider next the resolution in the x and y directions in a case where the positional relationship between the objective lens 1 and a specimen changes in a plane perpendicular to the z direction (in a case where the positional relationship changes in the x and y directions). Let $f_{OB}$ be the focal length of the objective lens 1 and $f_{MLA}$ be the focal length of each of the unit lenses 5a of the microlens array 5. An image formation magnification β is then expressed by the following Expression (5):

$$\beta = \frac{f_{MLA}}{f_{OB}} \quad (5)$$

When an object point on the optical axis is shifted in the y direction by Δy, the displacement Δylo in each of the pixel groups 6b of the focus imaging device 6 is expressed by the following Expression (6):

$$\Delta y_{lo} = \beta \Delta y = \frac{f_{MLA}}{f_{OB}} \Delta y \quad (6)$$

Expression (6) clearly shows that a large focal length $f_{MLA}$ of the unit lenses 5a provides high transverse resolution detection of the image formation position.

Consider next the detectable range in a case where the positional relationship between the objective lens 1 and a specimen changes in the x and y directions. Let $d_{MLA}$ be the diameter of each of the unit lenses 5a, and the relationship expressed by Expression (6) described above shows that the displacement $\Delta$ylo in each of the pixel groups 6b of the focus imaging device 6 needs to satisfy the following Expression (7):

$$\Delta y_{lo} = \beta \Delta y = \frac{f_{MLA}}{f_{OB}} \Delta y < \frac{d_{MLA}}{2} \quad (7)$$

Based on a desired amount of shift y to be detected and the magnification β, it is desirable to use Expression (7) to calculate a necessary diameter $d_{MLA}$ of each of the unit lenses 5a, which form the microlens array 5.

The above description has been made with reference to the microlens array 5 formed of a plurality of unit lenses 5a arranged two-dimensionally. Alternatively, a microlens array formed of a plurality of unit lenses arranged one-dimensionally may be used.

Further, the above description has been made with reference to the case where a micro-optic array (microlens array) is used as the optical mechanism 5, which forms the focus position maintaining apparatus 20 according to the present embodiment. The optical mechanism 5 may alternatively be formed of an image forming optical system 51 disposed in a position where it receives light from a specimen via the objective lens 1 and forming an image of the specimen and a diaphragm 52 disposed on the image side of the image forming optical system 51 and having an opening 52a, through which part of the light having exited out of the image forming optical system 51 passes, as shown in FIG. 11. The diaphragm 52 can be moved in a direction perpendicular to the optical axis relative to the image forming optical system 51, and the opening 52a can therefore be moved in a plane perpendicular to the optical axis of a light flux having exited out of the image forming optical system 51, whereby the diaphragm 52 has a function as a mechanism capable of acquiring a light flux containing the optical axis of the objective lens 1 and other light fluxes.

In the optical mechanism 5 including the image forming optical system 51 and the diaphragm 52 described above, to detect a change in the position of a specimen in the xy plane, the diaphragm 52 is so moved that the optical axis of the objective lens 1 passes through the opening 52a. When the specimen moves in the xy plane in this state, the position where an image of the specimen is formed by the light having passed through the opening 52a moves accordingly, as in the description above. On the other hand, to detect a change in the position of the specimen in the z direction, the diaphragm 52 is so moved that the optical axis of the objective lens 1 does not pass through the opening 52a (the opening 52a is located at the periphery of the light flux having exited out of the image forming optical system 51). When the specimen moves in the z direction in this state, the position where an image of the specimen is formed by the light having passed through the opening 52a moves accordingly, as in the above description. In the configuration described above, the control unit 7, which is not shown in FIG. 11, controls the operation of the focus actuator 8 in such a way that the image is located at the center of the pixel group 6b corresponding to the position of the opening 52a of the diaphragm 52, whereby the change in the position of the specimen can be corrected three-dimensionally.

REFERENCE SIGNS LIST

1 Objective lens
5 Optical mechanism (microlens array)
5a Unit lens
6 Focus imaging device
7 Control unit
8 Focus actuator
10 Microscope
20 Focus position maintaining apparatus
30 Projection unit
51 Image forming optical system
52 Diaphragm
52a Opening

The invention claimed is:

1. A focus position maintaining apparatus that controls operation of a focus actuator that changes the positional relationship between a specimen and an objective lens to maintain the focal point of the objective lens in a desired position in the specimen, the apparatus comprising:
    an optical mechanism that is disposed in a position where the optical mechanism receives light from the specimen via the objective lens;
    an imaging device disposed in a position where the imaging device receives light from the optical mechanism; and
    a control unit that controls the operation of the focus actuator,
    wherein the optical mechanism is a micro-optic array that splits the wavefront of the light to form a plurality of images of the specimen on the imaging device and that is formed of a plurality of unit lenses, each of the unit lenses forming a distinct respective one of the plurality of images, the micro-optic array comprising a first of the unit lenses that is located in a position shifted from the optical axis of the objective lens and a second of the unit lenses that is located on the optical axis of the objective lens, and
    the control unit
        (i) detects the amount and direction of shift of the specimen along the optical axis of the objective lens based on the position where the image of the specimen is formed by the first of the unit lenses and detected by the imaging device, and outputs a control signal to the focus actuator based on the detected amount and direction of shift of the specimen along the optical axis, and/or
        (ii) detects the amount and direction of shift of the specimen in a plane perpendicular to the optical axis of the objective lens based on the position where the image of the specimen is formed by the second of the unit lenses and detected by the imaging device, and outputs a control signal to the focus actuator based on the detected amount and direction of shift of the specimen in the plane perpendicular to the optical axis.

2. The focus position maintaining apparatus according to claim 1, wherein the optical mechanism is disposed in a position substantially conjugate with an exit pupil of the objective lens.

3. The focus position maintaining apparatus according to claim 1, wherein
the imaging device is disposed in a focus position of the plurality of unit lenses that form the micro-optic array.

4. The focus position maintaining apparatus according to claim 1, wherein
the focus position maintaining apparatus further comprises a projection unit that projects a pattern on the specimen via the objective lens, and
the control unit detects the amount and direction of shift of the specimen by using an image of the pattern.

5. A microscope characterized in that the microscope comprises:
an objective lens;
a focus actuator that changes the positional relationship between a specimen and the objective lens; and
the focus position maintaining apparatus according to claim 1.

6. A focus position maintaining apparatus that controls operation of a focus actuator that changes the positional relationship between a specimen and an objective lens to maintain the focal point of the objective lens in a desired position in the specimen, the apparatus comprising:
an optical mechanism that is disposed in a position where the optical mechanism receives light from the specimen via the objective lens;
an imaging device disposed in a position where the imaging device receives light from the optical mechanism; and
a control unit that controls the operation of the focus actuator,
wherein the optical mechanism comprises an image forming optical system and a mechanism which has an opening allowing a part of light emitted from the image forming optical system to pass and is able to move the position of the opening,
the optical mechanism forms an image of the specimen,
the imaging device detects the image of the specimen, and
the control unit
(i) detects the amount and direction of shift of the specimen along the optical axis of the objective lens based on the position where the image of the specimen is formed with a light flux other than the light flux containing the optical axis of the objective lens and detected by the imaging device, and outputs a control signal to the focus actuator based on the detected amount and direction of shift of the specimen along the optical axis, and/or
(ii) detects the amount and direction of shift of the specimen in a plane perpendicular to the optical axis of the objective lens based on the position where the image of the specimen is formed with the light flux containing the optical axis of the objective lens and detected by the imaging device, and outputs a control signal to the focus actuator based on the detected amount and direction of shift of the specimen in the plane perpendicular to the optical axis.

7. The focus position maintaining apparatus according to claim 6, wherein
the mechanism having the opening is a diaphragm configured to move the position of the opening.

8. A microscope characterized in that the microscope comprises:
an objective lens;
a focus actuator that changes the positional relationship between a specimen and the objective lens; and
the focus position maintaining apparatus according to claim 6.

9. A focus position maintaining apparatus that controls operation of a focus actuator that changes the positional relationship between a specimen and an objective lens to maintain the focal point of the objective lens in a desired position in the specimen, the apparatus comprising:
an optical mechanism that is disposed in a position where the optical mechanism receives light from the specimen via the objective lens;
an imaging device disposed in a position where the imaging device receives light from the optical mechanism; and
a control unit that controls the operation of the focus actuator,
wherein the optical mechanism comprises an image forming optical system and a mechanism which allows a part of light emitted from the image forming optical system to pass,
the imaging device detects an image of the specimen,
the control unit detects the amount and direction of shift of the specimen in a plane perpendicular to the optical axis of the objective lens from the amount and direction of shift of an image formed by a light flux containing the optical axis of the objective lens and not formed by a light flux other than the light flux containing the optical axis, and the control unit outputs a control signal to the focus actuator based on the detected amount and direction of shift of the specimen in the plane perpendicular to the optical axis, and/or
the control unit detects the amount and direction of shift of the specimen along the optical axis of the objective lens from the amount and direction of shift of an image formed by a light flux not containing the optical axis of the objective lens and not formed by a light flux containing the optical axis, and the control unit outputs a control signal to the focus actuator based on the detected amount and direction of shift of the specimen along the optical axis.

10. The focus position maintaining apparatus according to claim 9, wherein
the mechanism which allows a part of light emitted from the image forming optical system to pass is a diaphragm configured to move the position of the opening.

11. A microscope characterized in that the microscope comprises:
an objective lens;
a focus actuator that changes the positional relationship between a specimen and the objective lens; and
the focus position maintaining apparatus according to claim 9.

12. A focus position maintaining apparatus that controls operation of a focus actuator that changes the positional relationship between a specimen and an objective lens to maintain the focal point of the objective lens in a desired position in the specimen, the apparatus comprising:
an optical mechanism that is disposed in a position where the optical mechanism receives light from the specimen via the objective lens;
an imaging device disposed in a position where the imaging device receives light from the optical mechanism; and
a control unit that controls the operation of the focus actuator, wherein the optical mechanism is a micro-optic array that splits the wavefront of the light to form a plurality of images of the specimen on the imaging device and that is formed of a plurality of unit lenses, each of the unit lenses forming a distinct respective one of the plurality of images, the micro-optic array comprising a first of the unit lenses that is located in a position shifted from the optical axis of the objective lens and a second of the unit lenses that is located on the optical axis of the objective lens, and the control unit
- (i) detects the amount and direction of shift of the specimen along the optical axis of the objective lens based on the position where the image of the specimen is formed by the first of the unit lenses and detected by the imaging device, and
- (ii) detects the amount and direction of shift of the specimen in a plane perpendicular to the optical axis of the objective lens based on the position where the image of the specimen is formed by the second of the unit lenses and detected by the imaging device, and outputs a control signal to the focus actuator based on the detected amount and direction of shift of the specimen in the plane perpendicular to the optical axis.

13. A focus position maintaining apparatus that controls operation of a focus actuator that changes the positional relationship between a specimen and an objective lens to maintain the focal point of the objective lens in a desired position in the specimen, the apparatus comprising:

an optical mechanism that is disposed in a position where the optical mechanism receives light from the specimen via the objective lens;

an imaging device disposed in a position where the imaging device receives light from the optical mechanism; and a control unit that controls the operation of the focus actuator, wherein the optical mechanism comprises an image forming optical system and a mechanism which has an opening allowing a part of light emitted from the image forming optical system to pass and is able to move the position of the opening, the optical mechanism forms an image of the specimen, the imaging device detects the image of the specimen, and the control unit

- (i) detects the amount and direction of shift of the specimen along the optical axis of the objective lens based on the position where the image of the specimen is formed with a light flux other than the light flux containing the optical axis of the objective lens and detected by the imaging device, and
- (ii) detects the amount and direction of shift of the specimen in a plane perpendicular to the optical axis of the objective lens based on the position where the image of the specimen is formed with the light flux containing the optical axis of the objective lens and detected by the imaging device, and outputs a control signal to the focus actuator based on the detected amount and direction of shift of the specimen in the plane perpendicular to the optical axis.

* * * * *